(12) United States Patent
Buonomo

(10) Patent No.: US 7,290,648 B2
(45) Date of Patent: Nov. 6, 2007

(54) DEVICE FOR MOVING A HEAVY LOAD

(75) Inventor: Marc Buonomo, Wissembourg (FR)

(73) Assignee: Compagnie Francaise Eiffel Construction Metallique, Colombes (FR)

( * ) Notice: Subject to any disclaimer, the term of this patent is extended or adjusted under 35 U.S.C. 154(b) by 529 days.

(21) Appl. No.: 10/815,748

(22) Filed: Apr. 2, 2004

(65) Prior Publication Data

US 2004/0226118 A1   Nov. 18, 2004

(30) Foreign Application Priority Data

Apr. 3, 2003   (FR) .................................. 03 04145

(51) Int. Cl.
   *B65G 25/04*   (2006.01)
   *B65G 25/00*   (2006.01)
(52) U.S. Cl. .............................. 198/750.2; 198/750.14; 198/750.1; 198/750.8; 198/777
(58) Field of Classification Search ............ 198/750.2, 198/750.14, 750.1, 750.4, 750.8, 773, 777, 198/463.3, 463.6; 14/77.1
   See application file for complete search history.

(56) References Cited

U.S. PATENT DOCUMENTS

| | | | | |
|---|---|---|---|---|
| 3,838,769 A | * | 10/1974 | Fishburne et al. | ....... 198/750.7 |
| 4,213,509 A |   | 7/1980  | Häfner |  |
| 4,217,113 A | * | 8/1980  | Suh et al. | ..................... 51/309 |
| 4,219,113 A | * | 8/1980  | Fieser et al. | ................. 198/414 |
| 4,387,800 A | * | 6/1983  | Noe | ......................... 198/750.8 |
| 4,838,515 A |   | 6/1989  | Prentice |  |
| 5,025,912 A | * | 6/1991  | Hashizume et al. | ...... 198/459.1 |
| 5,332,079 A | * | 7/1994  | Ueda et al. | ............. 198/457.03 |
| 5,653,329 A | * | 8/1997  | McTaggart | ................ 198/774.1 |
| 6,223,885 B1| * | 5/2001  | Markiewicz | ............. 198/463.3 |
| 6,364,093 B1| * | 4/2002  | LaBolt | ........................ 198/775 |
| 2002/0056608 A1| * | 5/2002 | Lecrivain | ............... 198/750.14 |
| 2003/0057060 A1| * | 3/2003 | Richardson | ................. 198/580 |

FOREIGN PATENT DOCUMENTS

SU   623819   9/1978

* cited by examiner

*Primary Examiner*—Gene O. Crawford
*Assistant Examiner*—Ramya G. Prakasam
(74) *Attorney, Agent, or Firm*—Greenblum & Bernstein, P.L.C.

(57) ABSTRACT

Arrangement for moving a heavy load wherein the arrangement includes at least one actuating unit. The at least one actuating unit utilizes a support for supporting the heavy load. A plurality of jacks are coupled to the support. A first movable element is adapted to slide within a channel of the support. The first movable element is movable in reciprocating manner. A second movable element is adapted to slide within the channel of the support. The second movable element slidably engages the first movable element and is movable in reciprocating manner. An actuating system is used for controlling sliding movements of the first and second movable elements. This Abstract is not intended to define the invention disclosed in the specification, nor intended to limit the scope of the invention in any way.

38 Claims, 2 Drawing Sheets

DEVICE FOR MOVING A HEAVY LOAD

CROSS-REFERENCE TO RELATED APPLICATIONS

The instant application claims priority under 35 U.S.C. §119 of French Application No. 0304145 filed on Apr. 3, 2003, the disclosure of which is hereby expressly incorporated by reference herein in its entirety.

BACKGROUND OF THE INVENTION

1. Field of the Invention

The invention relates to the displacement of heavy loads.

2. Description of the Prior Art

It is known to position the floor of a bridge by pushing the same in its longitudinal direction from a position in which it is located substantially in the alignment of its final position, on one of the banks or half on each bank of the depression which the bridge is intended to cross, the floor bearing on an increasing number of piles as it progresses. This modus operandi ceases to be applicable when the piles are very high, as there is a risk of deforming or breaking the piles under the horizontal thrust transmitted to them by the movement of the bridge floor.

SUMMARY OF THE INVENTION

The invention permits the positioning of the floor of a bridge on piles, whatever the height thereof.

More generally, the invention provides for a device for moving any heavy load in a horizontal or oblique direction.

The invention also relates to a device for imposing a movement comprising at least one horizontal component on a heavy load. The device incorporates at least one actuation unit which comprises a support which is immobile in the horizontal direction and which supports the load. A first mobile element for sliding relative to the support in a reciprocating movement comprises a horizontal component and a vertical component. A second mobile element is supported by the first mobile element and is intended to slide relative to the first mobile element in a reciprocating movement substantially parallel to the movement to be imposed on the load. An arrangement is provided for controlling the sliding of the first and second mobile elements according to consecutive cycles. Each cycle includes: a first phase in which the first mobile element effects a sliding stroke in the upward direction and raises the second mobile element, which is held substantially immobile in the horizontal direction and which itself lifts the load from the support; a second phase in which the first mobile element is kept substantially immobile and the second mobile element, jointly with the load supported thereby, effects a sliding stroke in the direction of movement to be imposed on the load; a third phase in which the first mobile element effects a sliding stroke in the downward direction and lowers the second mobile element, which is held substantially immobile in the horizontal direction and itself lowers the load in order to rest the same on the support; and a fourth phase in which the first mobile element is kept substantially immobile and the second mobile element effects a sliding stroke alone in the direction opposite to the movement to be imposed on the load.

Optional, complementary or alternative features of the invention are as follows.

The horizontal components of movements of the load and of the first mobile element have the same direction.

In the first phase of the cycle, the horizontal component of the movement of the first mobile element is oriented in the direction of the horizontal component of movement to be imposed on the load.

In the first phase of the cycle, the horizontal component of movement of the first mobile element is oriented in the direction opposite to the horizontal component of movement to be imposed on the load.

The support comprises two cheeks having respective higher edges in order simultaneously to support the load, the two cheeks defining between them a channel elongate substantially in the direction of movement to be imposed on the load, in which channel the mobile elements are housed.

The actuating unit is capable of adopting a variable incline in a vertical plane parallel to the direction of movement to be imposed on the load in order to adapt to the profile of the load in the said plane.

The actuating unit is supported by at least two fluidic jacks aligned in the direction of the horizontal component of the movement to be imposed on the load, the jacks intercommunicating via their fluid.

The arrangement for controlling the sliding of the mobile elements comprise fluidic jacks.

At least two actuating units are provided, spaced apart in at least one horizontal direction, the arrangement for controlling sliding of the mobile elements comprising an arrangement for synchronizing the movements of the mobile elements of the different actuating units.

Two actuating units are located in the vicinity of one another, the horizontal components of the movements of their first mobile elements being oriented in opposite directions.

The invention also provides for an arrangement for moving a heavy load, wherein the arrangement comprises at least one actuating unit. The at least one actuating unit comprises a support for supporting the heavy load. The support is prevented from moving along a horizontal direction. A first movable element is adapted to slide relative to the support. The first movable element is movable in reciprocating manner such that the reciprocating movement of the first movable element causes the first movable element to move horizontally and vertically. A second movable element is supported by the first movable element and is adapted to slide relative to the first moveable element. The second movable element is movable in reciprocating manner. An arrangement is used for controlling sliding movements of the first and second movable elements. The sliding movements may comprise a first phase in which the first movable element slides along a direction, moves in an upward direction, and causes upward movement of the second movable element, wherein the second movable element is substantially immobilised in the horizontal direction and wherein the second movable element lifts the heavy load from the support, a second phase in which the first movable element is substantially immobilised and the second movable element, along with the heavy load supported thereby, slides along a direction and causes the heavy load to move upwards, a third phase in which the first movable element slides along a direction, moves in a downward direction, and causes downward movement of the second movable element, wherein the second movable element is held substantially immobile in the horizontal direction and wherein the second movable element lowers the heavy load onto the support, and a fourth phase in which the first movable element is held substantially immobile and the second movable element slides along a direction and moves in a downward direction.

The heavy load may be adapted to move in the same horizontal direction as the first mobile element. The heavy load may be adapted to move in the same horizontal direction as the first mobile element. At the end of the fourth phase, the first and second movable elements may be arranged in the same position as in a beginning of the first phase. Relative to the first phase, the first movable element may slide in an opposite direction in the third phase. Relative to the second phase, the second movable element may slide in an opposite direction in the fourth phase.

The support may comprise two walls for simultaneously supporting the heavy load, and a channel arranged between the two walls. Each of the two walls may comprise an upper edge. The support may be elongated substantially in a direction of movement of the first movable element. The support may house the first and second movable elements. The first and second movable elements may slide within a channel of the support.

The at least one actuating unit may be structured and arranged to assume a variable gradient relative to the horizontal direction. The first movable element may move towards the second movable element in the first phase. The second movable element may move towards the first movable element in the second phase. The first movable element may move away from the second movable element in the third phase. The second movable element may move away from the first movable element in the fourth phase.

The support may comprise two walls having upper edges for simultaneously supporting the heavy load, the two walls defining between them an elongated channel, wherein the first and second movable elements slidable engage surfaces of the elongated channel.

The at least one actuating unit may further comprise at least two hydraulic jacks. The at least two hydraulic jacks may be arranged horizontally to support the heavy load.

The arrangement for controlling sliding movements of the first and second movable elements may comprise first and second hydraulic jacks. The first hydraulic jack may be structured and arranged to move the first movable element and the second hydraulic jack may be structured and arranged to move the second movable element The at least one actuating unit may comprise at least two horizontally spaced apart actuating units. The arrangement for controlling sliding movements of the first and second movable elements may be structured and arranged to synchronise movements of the first and second movable elements of the at least two horizontally spaced apart actuating units.

The heavy load and the first movable element may be adapted to move along a direction which has the same horizontal component.

The at least one actuating unit may comprise at least two horizontally spaced apart actuating units located in the vicinity of one another. The arrangement for controlling sliding movements of the first and second movable elements may be structured and arranged to synchronise movements of the first and second movable elements of the at least two horizontally spaced apart actuating units. The arrangement for controlling sliding movements of the first and second movable elements of each of the at least two horizontally spaced apart actuating units may comprises first and second actuating devices.

The arrangement may further comprise a control device for synchronising movements of the first and second movable elements of each of the at least two horizontally spaced apart actuating units. The first movable elements of the at least two horizontally spaced apart actuating units may be oriented in opposite directions and the second movable elements of the at least two horizontally spaced apart actuating units may be oriented in opposite directions.

The invention also provides for a method of lifting a heavy load using the arrangement described above, wherein the method comprises arranging the at least one actuating unit beneath the heavy load, lifting the heady load a first amount by performing the first, the second, the third and the fourth phases consecutively, and lifting the heady load a second amount by performing the first, the second, the third and the fourth phases consecutively.

The invention also provides for an arrangement for moving a heavy load, wherein the arrangement comprises at least one actuating unit. The at least one actuating unit comprises a support for supporting the heavy load. A plurality of jacks are coupled to the support. A first movable element is adapted to slide within a channel of the support. The first movable element is movable in reciprocating manner such that the reciprocating movement of the first movable element causes the first movable element to move horizontally and vertically. A second movable element is adapted to slide within the channel of the support. The second movable element slidably engages the first movable element and is movable in reciprocating manner towards and away from the first movable element. An actuating system is used for controlling sliding movements of the first and second movable elements.

The actuating system may comprise first and second actuating devices.

The invention also provides for a method of lifting a heavy load using the arrangement described above, wherein the method comprises sliding the first movable element along a first direction, wherein the sliding causes the first and second movable elements move in an upward direction, and wherein the heavy load is lifted from the support with the second movable element, during the sliding of the first movable element along the first direction, ensuring that the second movable element is substantially immobilized relative to the horizontal direction, sliding the second movable element, along with the heavy load supported thereby, along a second direction such that the heavy load is caused to move upwards, during the sliding of the second movable element along the second direction, ensuring that the first movable element is substantially immobilized relative to the horizontal direction, sliding the first movable element along a third direction such that the first and second movable elements move in a downward direction, during the sliding of the first movable element along the third direction, ensuring that the second movable element is substantially immobilized relative to the horizontal direction, sliding the second movable element along a fourth direction such that the second movable element moves in a downward direction, and during the sliding of the second movable element along the fourth direction, ensuring that the first movable element is substantially immobilized relative to the horizontal direction.

The first direction may be opposite the second direction. The third direction may be opposite the fourth direction. The first and third directions may be the same. The second and fourth directions may be the same.

The invention also provides for an arrangement for moving a heavy load, wherein the arrangement comprises at least one actuating unit. The at least one actuating unit comprises a support for supporting the heavy load. A plurality of jacks is arranged to lift the support. A first movable element is adapted to slidably engage the support. The first movable element is movable in a reciprocating manner such that the reciprocating movement of the first movable element causes the first movable element to move horizontally and vertically. A first actuating device is structured and arranged to move the first movable element in opposite directions. A second movable element is adapted to slidably engage the support and the first movable element. The second movable element is movable in reciprocating manner towards and away from the first movable element, and a second actuating device is structured and arranged to move the second movable element in opposite directions.

The invention also provides for a method of lifting a heavy load using the arrangement described above, wherein the method comprises sliding the first movable element along a first direction, wherein the sliding causes the first and second movable elements move in an upward direction, and wherein the heavy load is lifted from the support with the second movable element, during the sliding of the first movable element along the first direction, ensuring that the second movable element is substantially immobilized relative to the horizontal direction, sliding the second movable element, along with the heavy load supported thereby, along a second direction such that the heavy load is caused to move upwards, during the sliding of the second movable element along the second direction, ensuring that the first movable element is substantially immobilized relative to the horizontal direction, sliding the first movable element along a third direction such that the first and second movable elements move in a downward direction, during the sliding of the first movable element along the third direction, ensuring that the second movable element is substantially immobilized relative to the horizontal direction, sliding the second movable element along a fourth direction such that the second movable element moves in a downward direction, and during the sliding of the second movable element along the fourth direction, ensuring that the first movable element is substantially immobilized relative to the horizontal direction.

BRIEF DESCRIPTION OF THE DRAWINGS

The features and advantages of the invention are explained in more detail in the description below with reference to the attached drawings wherein.

DETAILED DESCRIPTION OF THE PRESENT INVENTION

Figure 7:
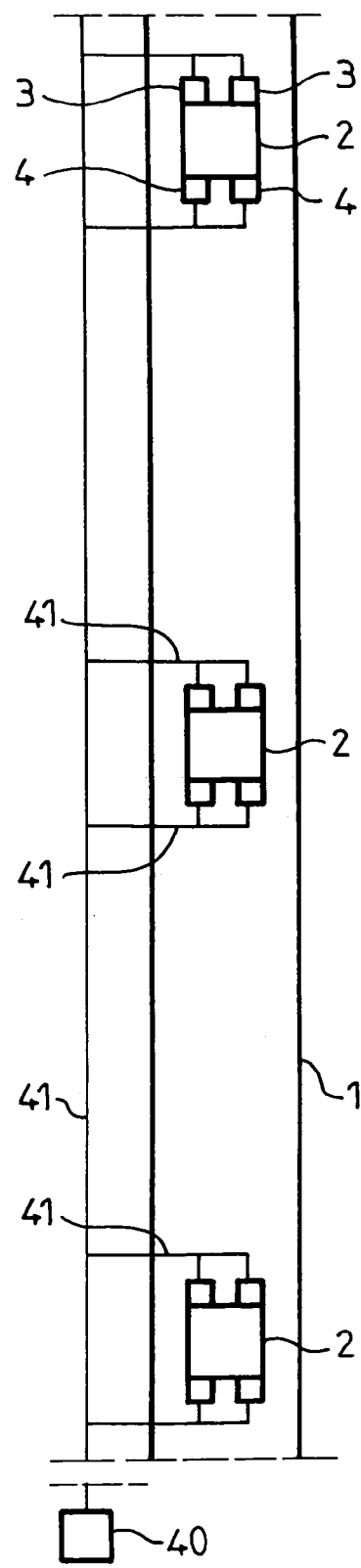
FIG. 7 is a diagram illustrating part of a bridge under construction and part of a device according to the invention used for positioning the floor of the bridge.

FIG. 7 shows the floor 1 of a bridge under construction and three piles 2 on which the floor 1 rests. At the top of each pile 2 are mounted four actuating units of a device according to the invention, i.e. two units 3 mounted side by side on the face of the pile 2 turned towards one of the ends of the bridge, and two units 4 mounted side by side on the opposite face of the pile 2.

One of the actuating units 3 is shown in more detail in FIGS. 1 to 4 and 6. The unit 3 comprises a support 10 which is elongate in the longitudinal direction of the bridge (referred to hereinafter as "longitudinal direction"), and which is fixed to the ends of the rods 11 of six hydraulic jacks 12, whose axes are vertical and are mutually aligned in the longitudinal direction. The bodies 13 of the jacks 12 are fixed. The support 10 is therefore immobile in the longitudinal direction, but may adopt a variable incline in a vertical plane containing the longitudinal direction (the plane of FIGS. 1 to 4), according to the relative positions of the rods 11. The support 10 comprises two lateral cheeks 14 (see FIG. 6) defining between them a channel 15 elongate in the longitudinal direction, whose plane base 16 is defined by a base part 17 belonging to the support 10. As can be seen from FIGS. 1 to 4, the base 16 is inclined and rises progressively to the right of FIG. 1 at a gradient which is, for example, 4.5%. A wedge 18 elongate in the longitudinal direction is housed in the channel 15. The wedge 18 has a plane lower face 19 which rests on the base 16, and a plane, horizontal upper face 20. The wedge 18 is surmounted by a slide 21, which is likewise elongate in the longitudinal direction. The slide 21 has a plane lower face 22 which rests on the upper face 20 of the wedge 18. The upper edges 23 of the cheeks 14 and the upper face 24 of the slide 21 have a gradient in the plane of FIG. 1 which corresponds to the gradient which the lower face of the bridge floor 1 must have at the point where the unit 3 is located. For the unit shown, this gradient is 3.025% and rises from left to right. The slide faces of the various components are advantageously covered with a material having a low coefficient of friction, such as PTFE.

In the initial state shown in FIG. 1, the face 24 is located at 22 mm below the edges 23. There is therefore a clearance of 22 mm between the bridge floor 1, which rests on the edges 23, and the face 24. In the first phase of the cycle, the wedge 18, under the action of a hydraulic jack 30, effects a stroke of 600 mm from left to right in FIG. 1. Taking into account the gradient of 4.5% of the base 16 on which the wedge 18 rests, this rises by 27 mm. The slide 21, which is kept immobile in its sliding direction, indicated by a double arrow D, by a hydraulic jack 31, rises 27 mm with the wedge 18 on which it rests. During this movement, the upper face 24 of the slide 21 comes into contact with the floor 1, which rises 5 mm above the edges 23. This state is shown in FIG. 2.

Figure 1:
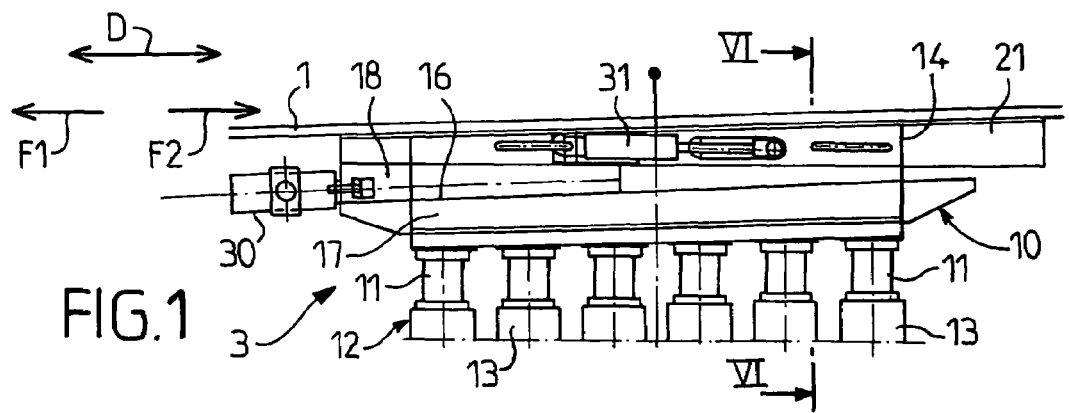
FIGS. 1 to 4 are views in elevation of an actuating unit of a device according to the invention at four consecutive points in its operating cycle.
Figure 2:
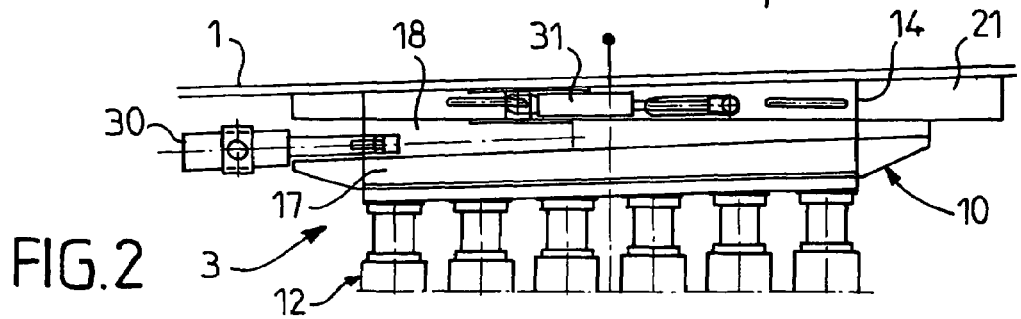
Figure 3:
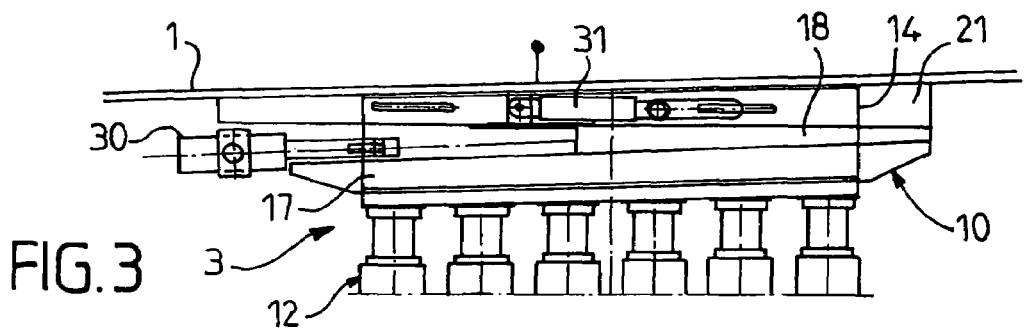
Figure 4:
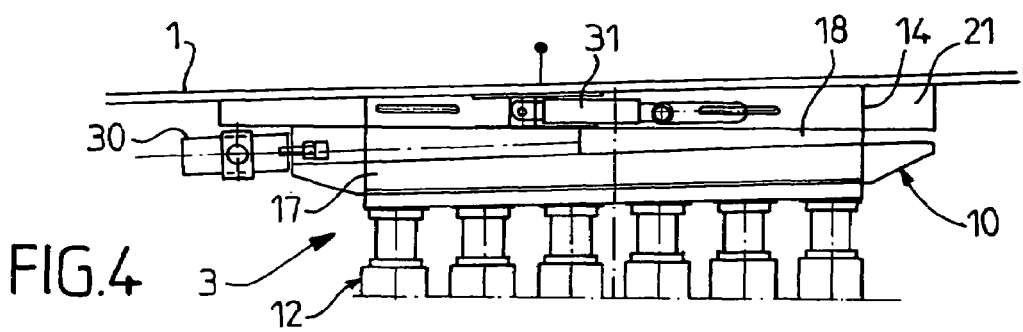

During the second phase of the cycle, under the action of the jack 31, the slide 21 moves to the left of FIGS. 1 to 4, following the arrow F1, by sliding over the horizontal upper face 20 of the wedge 18, which is kept immobile by the jack 30. The slide 21 drives the bridge floor 1 in this displacement. Taking account of the gradient of 3.025% of the edges 23, the distance between these and the lower face of the bridge floor 1 increases by 18.15 mm, reaching 23.15 mm at the end of the stroke. This state is shown in FIG. 3.

During the third phase of the cycle, the jack 30 acts on the wedge 18 in order to return the same to its starting position. The slide 21 is once more immobilized in the longitudinal direction by the jack 31, and is lowered by 27 mm. During this movement, the bridge floor is once more placed on the edges 23 of the cheeks 14, whereupon the slide continues to be lowered by 3.85 mm. The unit 3 then adopts the state shown in FIG. 4.

During the fourth phase of the cycle, the jack 31 acts on the slide 21 in the direction of the arrow F2 in order to return the same to its starting position. The wedge 18 is kept immobile by the jack 30. The distance between the upper face 24 of the slide 21 and the bridge floor 1 increases by 18.15 mm, reaching 22 mm again. The floor 1 remains bearing on the edges 23 and is therefore kept immobile. The state of the unit 3 is once more that shown in FIG. 1.

An arrangement (not shown) may be provided to lock the position of the bridge floor 1 except during the second phase and to prevent accidental return movement, in particular in the case of upward movement.

Lifting arrangements (which are known per se) may also be provided to raise the front end of the bridge floor 1 when this comes close to a pile 2 and to place it thereon.

As indicated above, the jacks 13 make it possible to control the gradient of the support 10 in the plane of FIG. 1, and consequently to adapt, if necessary, the gradient of the edges 23 and of the face 24 to that of the bridge floor 1. This can be effected by connecting the jacks 13 in parallel. The hydraulic fluid is distributed between them in order to make each rod 11 extend so as to bring the edges 23, or the face 24 as the case may be, automatically into contact with the bridge floor 1 over their entire length.

Figure 5:
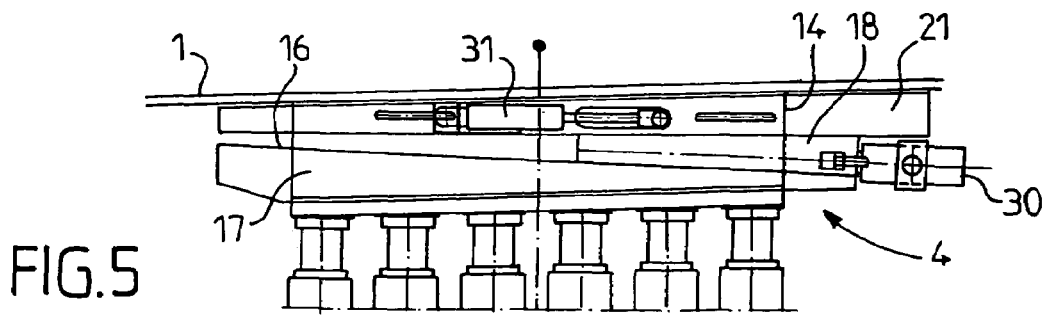
FIG. 5 is a view corresponding to FIG. 1, showing another actuating unit associated with that of FIG. 1 in the device.
Figure 6:
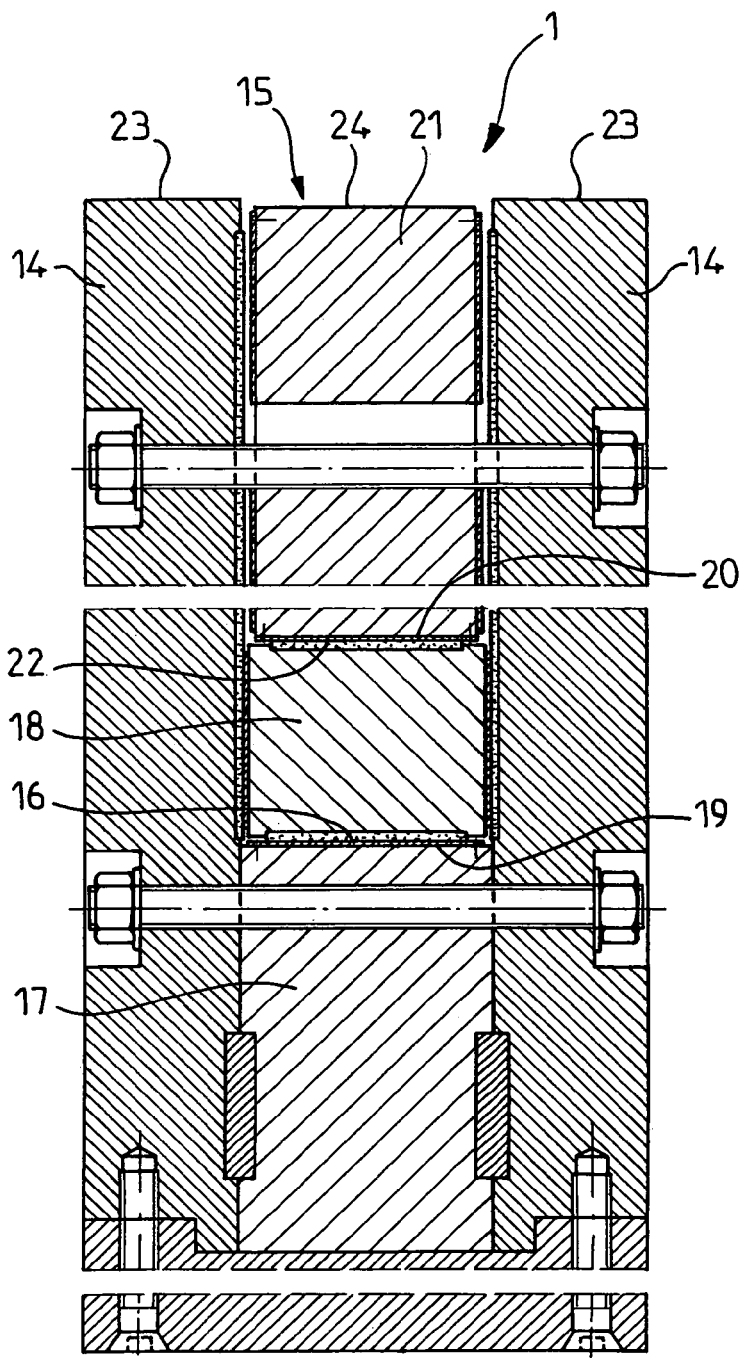
FIG. 6 is a partial view in section along the line VI-VI of FIG. 1.

The unit 4 shown in FIG. 5 is similar to the unit 3 of FIG. 1, apart from the fact that the gradient of the base 16 of the channel is oriented opposite to that of the base 16 of FIG. 1, i.e. the base 16 gradually descends from left to right in FIG. 5. The height of the wedge 18 of FIG. 5 therefore gradually increases from left to right, in the opposite manner to FIG. 1. The horizontal component of the reciprocating movement of the wedge 18 is likewise reversed, i.e. the wedge 18 moves from right to left in the first phase of the cycle, and from left to right in the third phase. The vertical displacements of the upper edges of the cheeks 14 of the support 10 and of the upper face of the slide 21 relative to one another and relative to that of the bridge floor 1 are unchanged.

FIG. 7 shows, apart from the elements already described, a central control unit 40 connected by transmission lines 41 to the actuating units 3 and 4. Via the lines 41, the control unit 40 sends to the actuating units 3, 4 synchronization signals which make it possible to trigger the phases of the cycles of the different units simultaneously and to ensure uniform displacement of the bridge floor. This means that the movements of the wedges 18 of all the actuating units are synchronized with one another, and the movements of the slides 21 of all the actuating units 3 and 4 are synchronized with one another. The control unit 40 may furthermore control the amplitude of these movements by way of position sensors, so as to limit mechanical stresses which might result from differences in amplitude. The control unit 40 may also act on the power supply to the jacks 12 in order to adjust the gradient of the faces of the wedges 18 and slides 21 which slide over one another and consequently the vertical component of the movement of the load.

Although the invention has been described in its application to the displacement of a bridge floor, obviously it may be applied to the displacement of any heavy load, on the ground or in the air, which may be not only elongate in a main direction, like a bridge floor, but also extended in two directions. A device according to the invention is applicable for example to the transfer of a load between a road vehicle and a railroad wagon, or to the displacement of a building. In the case illustrated above, where the upper face of the first mobile element is not horizontal but inclined, the movement of the load will comprise a vertical component, either up or down, beside its horizontal component. Furthermore, according to the applications, arrangements may be provided to make the actuating units pivot about a vertical axis so as to vary the orientation of the horizontal component of movement of the load.

What is claimed is:

1. An arrangement for moving a heavy load, the arrangement comprising:
   at least one actuating unit;
   the at least one actuating unit comprising a support for supporting the heavy load;
   the support being immobile along a horizontal direction;
   a first movable element being slidable relative to the support in a reciprocating manner such that the reciprocating movement of the first movable element causes the first movable element to move horizontally and vertically;
   a second movable element supported by the first movable element and being adapted to slide relative to the first moveable element in reciprocating manner;
   an arrangement for controlling sliding movements of the first and second movable elements,
   wherein the sliding movements comprise:
      a first phase in which the first movable element slides along a direction, moves in an upward direction, thereby raising the second movable element, which is substantially immobilized in the horizontal direction and wherein the second movable element lifts the heavy load from the support;
      a second phase in which the first movable element is substantially immobilized and the second movable element, along with the heavy load supported thereby, slides along a direction of intended movement for the heavy load;
      a third phase in which the first movable element slides in a downward direction, thereby lowering the second movable element, which is substantially immobile in the horizontal direction and lowers the heavy load onto the support; and
      a fourth phase in which the first movable element is held substantially immobile and the second movable element slides along a direction opposite to a direction of movement of the heavy load.

2. The arrangement of claim 1, wherein the heavy load is adapted to move in the same horizontal direction as the first movable element.

3. The arrangement of claim 2, wherein, at the end of the fourth phase, the first and second movable elements are arranged in the same position as in a beginning of the first phase.

4. The arrangement of claim 1, wherein, relative to the first phase, the first movable element slides in an opposite direction in the third phase.

5. The arrangement of claim 1, wherein, relative to the second phase, the second movable element slides in an opposite direction in the fourth phase.

6. The arrangement of claim 1, wherein the support comprises two walls for simultaneously supporting the heavy load, and a channel arranged between the two walls.

7. The arrangement of claim 6, wherein each of the two walls comprises an upper edge.

8. The arrangement of claim 6, wherein the support is elongated substantially in a direction of movement of the first movable element.

9. The arrangement of claim 8, wherein the support houses the first and second movable elements.

10. The arrangement of claim 1, wherein the first and second movable elements slide within a channel of the support.

11. The arrangement of claim 1, wherein the at least one actuating unit is structured and arranged to assume a variable gradient relative to the horizontal direction.

12. The arrangement of claim 1, wherein the first movable element moves towards the second movable element in the first phase.

13. The arrangement of claim 1, wherein the second movable element moves towards the first movable element in the second phase.

14. The arrangement of claim 1, wherein the first movable element moves away from the second movable element in the third phase.

15. The arrangement of claim 1, wherein the second movable element moves away from the first movable element in the fourth phase.

16. The arrangement of claim 1, wherein the support comprises two walls having upper edges for simultaneously supporting the heavy load, the two walls defining between them an elongated channel, wherein the first and second movable elements slidably engage surfaces of the elongated channel.

17. The arrangement of claim 1, wherein the at least one actuating unit further comprises at least two hydraulic jacks.

18. The arrangement of claim 17, wherein the at least two hydraulic jacks are arranged horizontally to support the heavy load.

19. The arrangement of claim 1, wherein the arrangement for controlling sliding movements of the first and second movable elements comprises first and second hydraulic jacks.

20. The arrangement of claim 19, wherein the first hydraulic jack is structured and arranged to move the first movable element and wherein the second hydraulic jack is structured and arranged to move the second movable element.

21. The arrangement of claim 1, wherein the at least one actuating unit comprises at least two horizontally spaced apart actuating units.

22. The arrangement of claim 21, wherein the arrangement for controlling sliding movements of the first and second movable elements is structured and arranged to synchronise movements of the first and second movable elements of the at least two horizontally spaced apart actuating units.

23. The arrangement of claim 1, wherein the heavy load and the first movable element are adapted to move along a direction which has the same horizontal component.

24. The arrangement of claim 1, wherein the at least one actuating unit comprises at least two horizontally spaced apart actuating units located in the vicinity of one another.

25. The arrangement of claim 24, wherein the arrangement for controlling sliding movements of the first and second movable elements is structured and arranged to synchronise movements of the first and second movable elements of the at least two horizontally spaced apart actuating units.

26. The arrangement of claim 24, wherein the arrangement for controlling sliding movements of the first and second movable elements of each of the at least two horizontally spaced apart actuating units comprises first and second actuating devices.

27. The arrangement of claim 24, further comprising a control device for synchronising movements of the first and second movable elements of each of the at least two horizontally spaced apart actuating units.

28. The arrangement of claim 24, wherein the first movable elements of the at least two horizontally spaced apart actuating units are oriented in opposite directions and wherein the second movable elements of the at least two horizontally spaced apart actuating units are oriented in opposite directions.

29. A method of moving a heavy load using the arrangement of claim 1, the method comprising:
arranging the at least one actuating unit beneath the heavy load; and
performing the first, the second, the third and the fourth phases consecutively, whereby the heavy load is moved.

30. An arrangement for moving a heavy load, the arrangement comprising:
at least one actuating unit;
the at least one actuating unit comprising a support for supporting the heavy load;
a plurality of jacks coupled to the support;
a first movable element adapted to slide within a channel of the support;
the first movable element being movable in reciprocating manner such that the reciprocating movement of the first movable element causes the first movable element to move horizontally and vertically;
a second movable element adapted to slide within the channel of the support;
the second movable element slidably engaging the first movable element and being movable in reciprocating manner towards and away from the first movable element; and
an actuating system for controlling sliding movements of the first and second movable elements.

31. The arrangement of claim 30, wherein the actuating system comprises first and second actuating devices.

32. A method of lifting a heavy load using the arrangement of claim 30, the method comprising:
sliding the first movable element along a first direction, wherein the sliding causes the first and second movable elements move in an upward direction, and wherein the heavy load is lifted from the support with the second movable element;
during the sliding of the first movable element along the first direction, ensuring that the second movable element is substantially immobilized relative to the horizontal direction;
sliding the second movable element, along with the heavy load supported thereby, along a second direction such that the heavy load is caused to move upwards;
during the sliding of the second movable element along the second direction, ensuring that the first movable element is substantially immobilized relative to the horizontal direction;
sliding the first movable element along a third direction such that the first and second movable elements move in a downward direction;
during the sliding of the first movable element along the third direction, ensuring that the second movable element is substantially immobilized relative to the horizontal direction
sliding the second movable element along a fourth direction such that the second movable element moves in a downward direction; and
during the sliding of the second movable element along the fourth direction, ensuring that the first movable element is substantially immobilized relative to the horizontal direction.

33. The method of claim 32, wherein the first direction is opposite the second direction.

34. The method of claim 32, wherein the third direction is opposite the fourth direction.

35. The method of claim 32, wherein the first and third directions are the same.

36. The method of claim 32, wherein the second and fourth directions are the same.

37. An arrangement for moving a heavy load, the arrangement comprising:
- at least one actuating unit;
- the at least one actuating unit comprising a support for supporting the heavy load;
- a plurality of jacks arranged to lift the support;
- a first movable element adapted to slidably engage the support;
- the first movable element being movable in a reciprocating manner such that the reciprocating movement of the first movable element causes the first movable element to move horizontally and vertically;
- a first actuating device structured and arranged to move the first movable element in opposite directions;
- a second movable element adapted to slidably engage the support and the first movable element,
- the second movable element being movable in reciprocating manner towards and away from the first movable element; and
- a second actuating device structured and arranged to move the second movable element in opposite directions.

38. A method of lifting a heavy load using the arrangement of claim 37, the method comprising:
- sliding the first movable element along a first direction, wherein the sliding causes the first and second movable elements move in an upward direction, and wherein the heavy load is lifted from the support with the second movable element;
- during the sliding of the first movable element along the first direction, ensuring that the second movable element is substantially immobilized relative to the horizontal direction;
- sliding the second movable element, along with the heavy load supported thereby, along a second direction such that the heavy load is caused to move upwards;
- during the sliding of the second movable element along the second direction ensuring that the first movable element is substantially immobilized relative to the horizontal direction;
- sliding the first movable element along a third direction such that the first and second movable elements move in a downward direction;
- during the sliding of the first movable element along the third direction, ensuring that the second movable element is substantially immobilized relative to the horizontal direction;
- sliding the second movable element along a fourth direction such that the second movable element moves in a downward direction; and
- during the sliding of the second movable element along the fourth direction ensuring that the first movable element is substantially immobilized relative to the horizontal direction.

\* \* \* \* \*